United States Patent [19]
Dunphy
[11] 4,003,039
[45] Jan. 11, 1977

[54] OPTICAL FIRE DETECTION SYSTEM

[75] Inventor: Matthew J. Dunphy, Braintree, Mass.
[73] Assignee: Pyrotector, Incorporated, Hingham, Mass.

[22] Filed: July 19, 1973
[21] Appl. No.: 380,849
[52] U.S. Cl. .......................... 340/228 R; 340/409; 250/554
[51] Int. Cl.² .................. G08B 21/00; G01N 21/58
[58] Field of Search ...................... 340/228 R, 409; 250/554, 200

[56] References Cited

UNITED STATES PATENTS 3,122,638 2/1964 Steele et al. ............ 340/228 R UX
3,378,829 4/1968 Alafi et al. ...................... 340/228 R
3,564,524 2/1971 Walthard et al. .............. 340/228 R

*Primary Examiner*—John W. Caldwell
*Assistant Examiner*—William M. Wannisky
*Attorney, Agent, or Firm*—Robert E. Ross

[57] ABSTRACT

A fire detection system of the type utilizing an optical detector with discriminating photo-cells connected in series to form a voltage divider, with the rise in voltage at the junction of the photo-cells being utilized as the input to an amplifier to energize an alarm or actuate an extinguishing system, in which the ground wire to the remote optical detectors is also used as the ground wire between the amplifier and the actuating means for the alarm or the extinguishing system, whereby a break in the ground wire, which causes a rise in voltage at the junction, is prevented from causing a false alarm, since said break also breaks the circuit between the amplifier and the actuating means.

4 Claims, 1 Drawing Figure

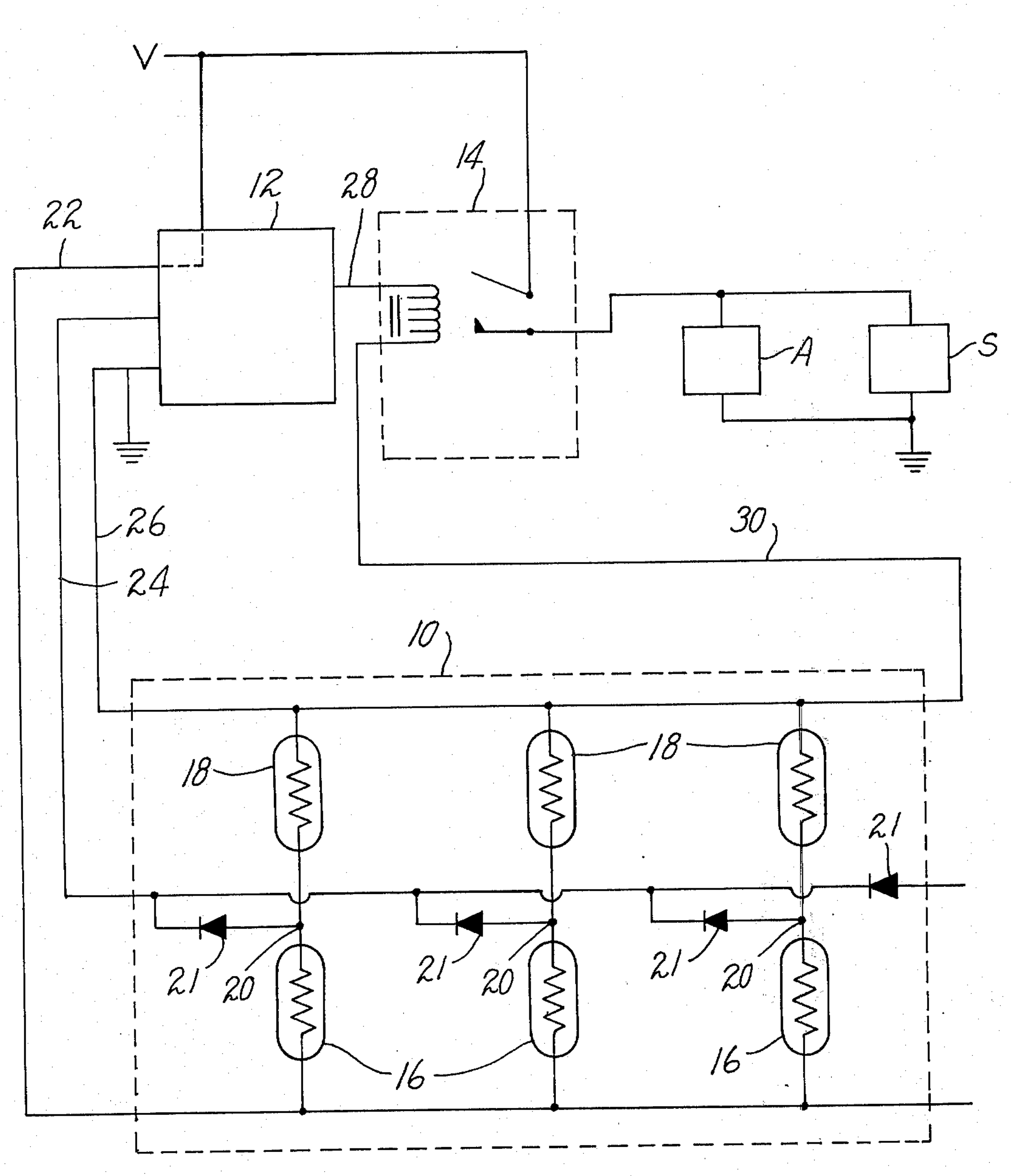
V
12
28
14
22
A
S
26
24
30
10
18
18
21
21
20
21
20
21
20
16
16

OPTICAL FIRE DETECTION SYSTEM

BACKGROUND OF THE INVENTION

Certain types of fire detecting apparatus utilize an optical detector comprising a pair of photo-cells connected in series across a voltage source. The cells are responsive to different wave lengths of light, so that on receiving sunlight or incandescent light, both cells respond by a drop in resistance, so that the voltage at the junction between the cells changes only slightly. However, when exposed to light with substantially only infrared or red components, the resistance of one cell drops substantially, and the resistance of the other cell drops little, of at all. Hence, assuming that the positive side of the source is connected to the red-responsive cell, the voltage at the junction rises appreciably, and this rise in voltage is used as the input to an amplifier to actuate an alarm. A detector of this type is shown in U.S. Pat. No. 3,188,593 issued June 8, 1965.

One problem associated with detector systems of this type is the fact that when a break occurs in the ground lead to the remote optical detectors, the voltage at the junction will rise to nearly the full supply voltage, causing a false alarm. When the detector is connected to automatic extinguishing equipment, a break in the ground line will cause a false firing of the extinguishing medium.

SUMMARY OF THE INVENTION

In an optical detector system of the type described, the amplifier is connected to an actuating device, such as a relay, for an alarm or an extinguishing releasing device, or both, through a power lead and a return or ground lead. In the system disclosed herein, the ground lead to the remote detectors is utilized as the ground lead between the amplifier and the actuating device. Hence if a break occurs in the ground lead to the remote detectors, although the junction voltage rises high enough to cause the amplifier to attempt to energize the actuating device, the open ground lead has also broken the circuit between the amplifier and the alarm actuating device.

BRIEF DESCRIPTION OF THE DRAWINGS

The drawing is a schematic diagram of a detector system embodying the features of the invention.

DESCRIPTION OF THE ILLUSTRATED EMBODIMENT

Referring to the drawing, there is illustrated a fire detector system comprising a group of parallel connected optical detectors 10, a transistor amplifier 12, and an actuating means for an alarm device or extinguishing system, such as relay 14.

The detectors 10 each comprises two photo-cells 16 and 18 connected in series across a power source V. The junction 20 between the cells of each detector is connected to the input of the transistor amplifier 12 through isolating diodes 21. The output of the amplifier is connected to the actuating coil of the relay 14 by a pair of leads in a manner to appear hereinafter.

As described in the above-mentioned U.S. Pat. No. 3,188,593, the cell 16 is primarily responsive by a decrease in resistance to light in the red to infra-red band, and the cell 18 is primarily responsive to light in the blue band. The voltage at the junction 20 is therefore a function of the supply voltage V and the ratio of the resistances of the photo-cells 16 and 18. During normal standby conditions, when, for example, only incandescent light is falling on the detector, the resistance of the red-responsive cell may be about 34,000 ohms and the resistance of the blue responsive cell may be about 20,000 ohms. With a supply voltage of 28 volts, the junction voltage is therefore about 10.3 volts.

When the detector "sees" red or infra-red radiation from a fire, the resistance of the red cell drops substantially, depending on the intensity of the radiation, perhaps to 15,000 ohms; however the blue cell (assuming no other radiation) drops only to about 45,000 ohms. The junction voltage therefore rises to about 21 volts. The characteristics of the amplifier are such that when the junction voltage reaches half of the supply voltage, the amplifier actuates the relay to energize an alarm or an extinguishant releasing device such as a solenoid valve or squib S.

The amplifier and relay will normally be positioned on a main control panel (not shown), whereas the optical units will be disposed at various remote locations and are connected in parallel by a lead 22 from the voltage source V to one side of each of the red responsive cells 16, by a lead 24 from the amplifier input to each of the diodes 21, and by a lead 26 from the amplifier ground to the outside connection of each of the blue responsive cells 18.

It will be apparent that if either the power lead 22 or the signal lead 24 is broken, the system will merely become inoperative; however if the ground lead 26 is broken, the voltage at the amplifier input will rise to nearly full line voltage which, in the absence of the feature of the circuit to be described hereinafter, cause a false alarm or a false firing of the extinguishing system.

The amplifier is connected to the coil of the relay by a power lead 28 and a return or ground lead. In the illustrated embodiment of the invention the ground lead does not go directly from the amplifier to the relay, but instead the amplifier ground is connected to the ground of relay 14 by a lead 30 which extends from the ground connection at the most remote detector unit back to the relay.

Hence if a break occurs at any point in the ground lead 26 between the amplifier and the most remote detector unit, the detector unit or units without a ground connection to the amplifier will have an increased junction voltage which will appear at the input of the amplifier. However, under such conditions the amplifier cannot energize the relay because the return line thereto through lead 26 is broken.

If desired means may also be provided for testing the continuity of the power, signal, and ground leads. Such means is well known in the art and does not form part of the present invention.

Although the invention was developed for use in fire detection systems, it will be understood that the principles of the invention can be used in any application where a signal is derived from a voltage divider at a remote location.

Since certain obvious changes may be made in the illustrated embodiment of the invention without departing from the scope thereof, it is intended that all matter contained herein be interpreted in an illustrative and not a limiting sense.

I claim:

1. A condition sensing system which includes an amplifier and a remote condition sensing unit comprising a pair of impedence elements connected through a junction connected to the amplifier input across a voltage source, at least one of said impedence elements being responsive by a change in impedence to a condition to be detected, whereby a change in voltage occurs at the amplifier input, said amplifier being responsive to a predetermined change in voltage at the input to energize through a pair of circuit paths an actuating device, one of said circuit paths being by way of the full length of one of the power source leads to the condition sensing unit.

2. A condition sensing system which includes an amplifier and a remote condition sensing unit comprising a pair of impedence units connected through a junction connected to the amplifier input and across leads from a power source, one of said impedence units being responsive by a drop in resistance to a condition to be detected and said impedence units being so connected across the power source that said drop in resistance causes an increase in voltage at the amplifier input, the amplifier being responsive to an increase in voltage to a predetermined value to energize through a circuit path an alarm actuating device, the circuit path between the amplifier and said device including substantially the entire length of the lead between the power source and the other impedence unit, whereby a break in said lead which causes a rise in voltage at the amplifier input cannot cause energization of the alarm actuating device because the break in said lead also opens the circuit path between said alarm actuating device and the amplifier.

3. An optical fire detection system comprising an amplifier for energizing an alarm actuating device and at least one optical detector remote from the amplifier, said optical detector comprising a pair of photoresponsive devices connected in series across positive and negative power leads from the amplifier, the junction of said cells being connected to the amplifier input, the cell connected to said positive power lead being responsive by a drop in resistance to radiation in the red band, whereby a rise in voltage occurs at the amplifier input, said amplifier being responsive to the rise in said voltage to a predetermined value to energize an alarm actuating device through a circuit path comprising a power lead and a return path, said return path being along substantially the entire length of the negative power lead between the amplifier and said other photo-responsive device.

4. An optical fire detection system, comprising an amplifier, a group of optical detectors disposed remotely from the amplifier, said optical detectors each comprising series connected photo resistive cells, the junction of the cells being connected to the amplifier input, the outside end of the cells being connected to opposite poles of a power source, the cells which respond to radiation from a fire by a decrease in resistance being connected to the positive pole of the power source, the outside end of the other cells being connected to the negative pole of the power source, the output of the amplifier being connected to an actuating device by a positive lead and a negative return path, said return path being by way of substantially the entire length of the connection between the amplifier and the most remote of said other cells.

* * * * *